UNITED STATES PATENT OFFICE.

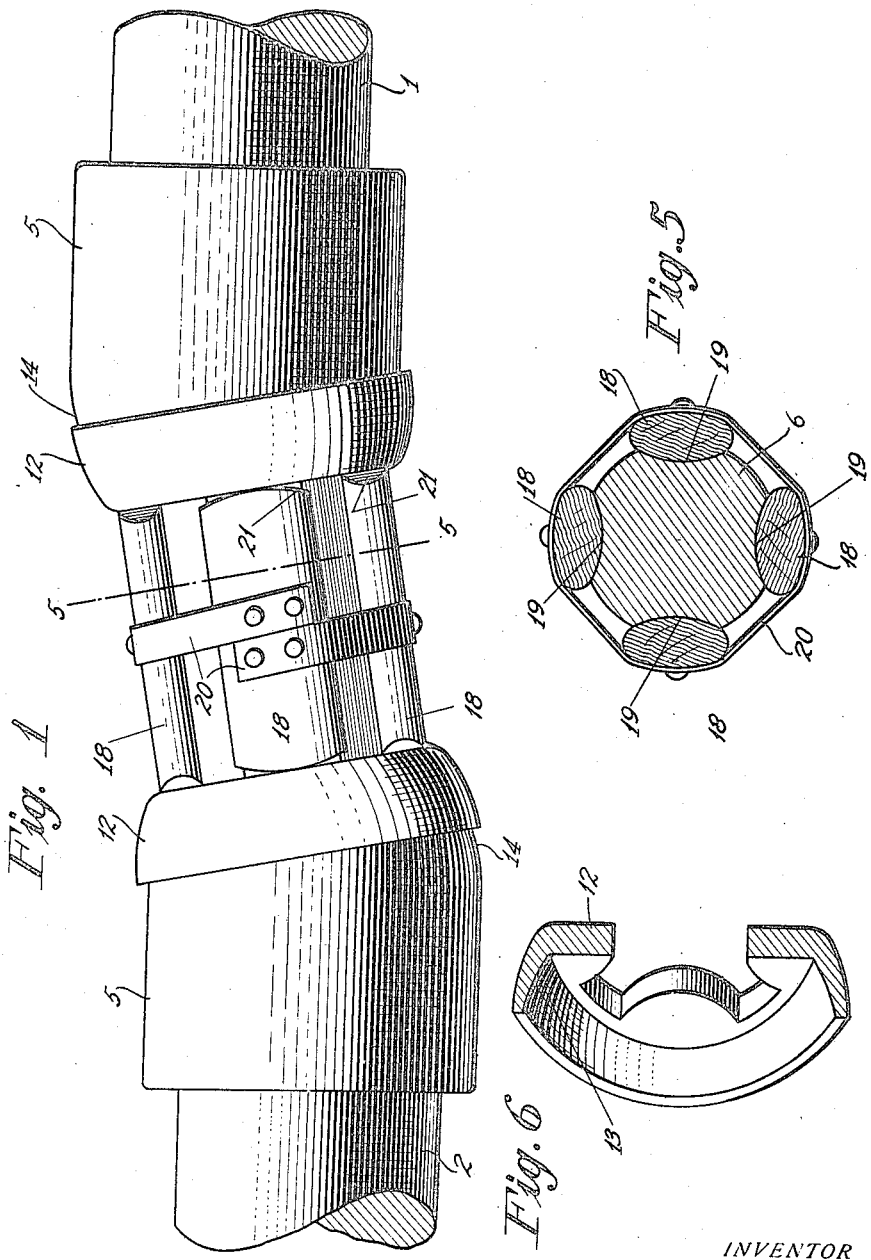

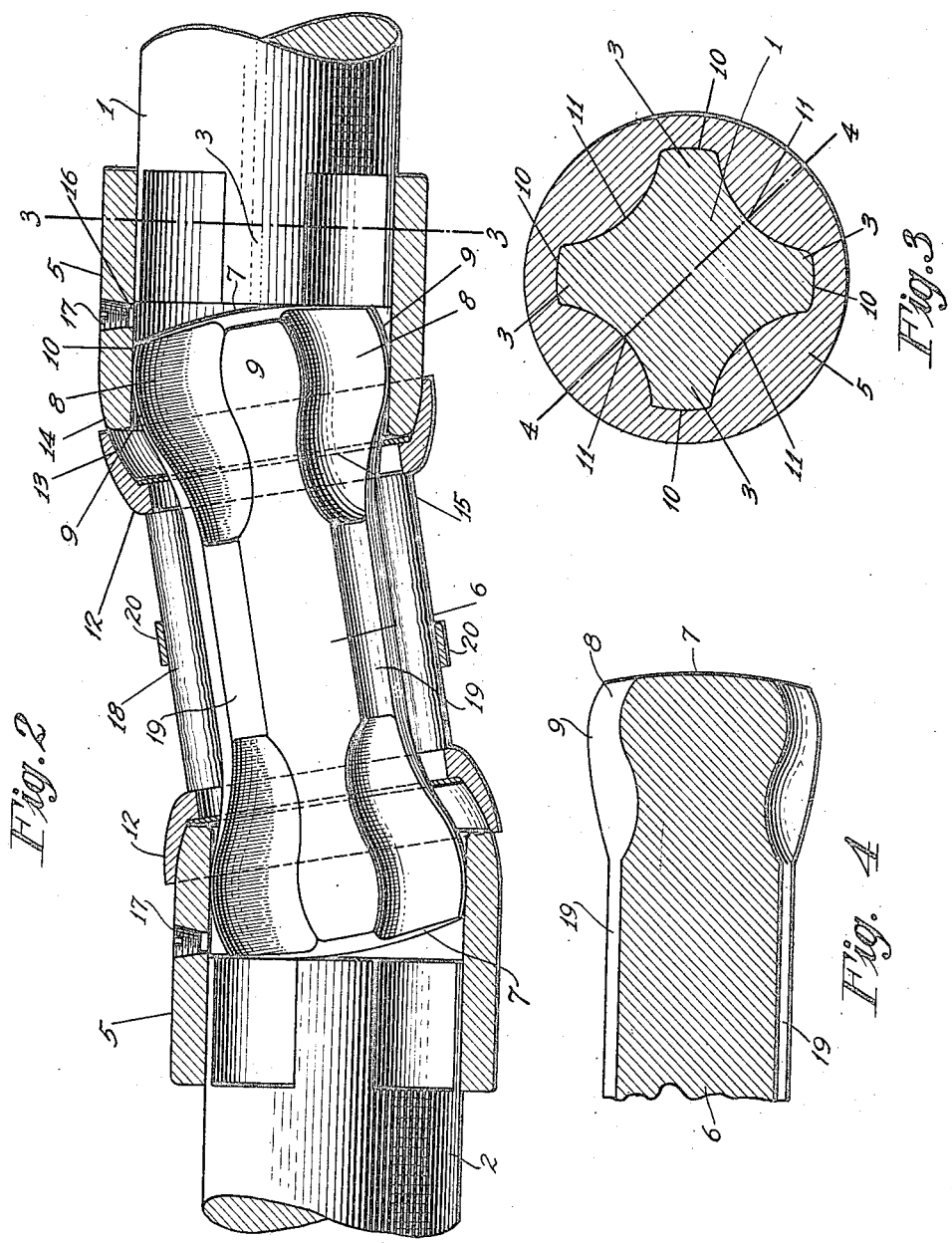

JOHN KNIGHT, OF BOUNDBROOK, NEW JERSEY, ASSIGNOR TO THE JOHN KNIGHT COMPANY, INC., OF ELIZABETH, NEW JERSEY, A CORPORATION OF NEW JERSEY.

UNIVERSAL COUPLING OR JOINT.

1,427,110.     Specification of Letters Patent.     Patented Aug. 29, 1922.

Application filed January 17, 1921. Serial No. 437,655.

*To all whom it may concern:*

Be it known that I, JOHN KNIGHT, a citizen of the United States, residing at Boundbrook, in the county of Somerset and State of New Jersey, have invented a new and useful Universal Coupling or Joint, of which the following is a specification.

This invention is a universal coupling for operatively connecting the ends of adjacent rolling mill rolls or the like, which rolls are adapted to be rotated one from the other and usually have their axes out of alinement.

The present invention, while particularly intended for this purpose, is, however, not restricted in this respect, and embodies universal joint construction well adapted for employment in other environments.

It has heretofore been common to connect the adjacent end of rolling mill rolls by a coupling through which one roll may be driven from the other but all of the prior devices have been so constructed that they embody so much lost motion that undue wear results, while the noise occasioned by the operation of the coupling is, at certain speeds, deafening. This is largely due to the fact that although the shafts are locked together for rotation, there is no close articulation between the parts of the coupling, but merely circumferential interlocking, so as the coupling operates, considerable vibration or slapping of the connecting element occurs and considerable wear also results through the inability, in most of the prior couplings, to properly lubricate the parts.

With these considerations in mind, the object of the present invention is a coupling having properly interfitted or circumferentially interlocked elements so that rotation may be efficiently transmitted through the coupling and at the same time these elements are so shaped that they will properly articulate with one another and practically eliminate lost motion in either a radial or longitudinal direction.

A further object of the invention is the incorporation in such a coupling of means for efficiently carrying out lubrication of the parts, so that through the proper articulation specified and efficient lubrication, vibration and jar will be eliminated and wear minimized.

Features of the invention, other than those specified, will be apparent from the hereinafter detailed description and claims, when read in conjunction with the accompanying drawings.

The accompanying drawings illustrate one practical embodiment of the present invention, but the construction therein shown is to be understood as illustrative, only, and not as defining the limits of the invention.

Figure 1 shows, in elevation, a coupling embodying the present invention operatively connecting adjacent ends of two rolls.

Figure 2 is a view similar to Figure 1, but showing parts of the coupling in central section.

Figure 3 is a section on the line 3—3 of Fig. 2.

Figure 4 is a section taken in the plane of the line 4—4 of Figure 3 through a connecting spindle forming part of the coupling.

Figure 5 is a section on the line 5—5 of Figure 1; and,

Figure 6 is a central section perspective of a cap employed.

Referring to the drawings, 1 designates the end of one rolling mill roll, and 2 the end of an adjacent roll. For the purpose of illustration and description herein, these parts will be referred to as rolling mill rolls, although it will be understood that they may be adjacent ends of line shafting or of any other shaft, axle, spindle or roll that it is desired to operatively connect for simultaneous and synchronous rotation.

In employing the present invention to couple together the roll ends 1 and 2, each of said ends if formed or cut away after the manner shown in Figures 2 and 3, so that the adjacent ends of the rolls embody a plurality of radial projections 3 which for present purposes may be termed teeth.

The cut away ends of the shafts 1 and 2 are adapted to fit into coupling sleeves 4 and project about half way through the sleeves as clearly shown in Figure 2. The sleeves 5 are preferably of cylindrical exterior configuration throughout substantially their entire lengths while interiorly they are formed complementary to the end cut away section of the rolls, so that said sleeves have interfitting relation with the teeth of the rolls, as shown in Figure 3. In this manner, the sleeves are locked against circumferential movement relative to their respective rolls.

Positioned between the ends of the rolls 1 and 2 is a spindle 6, the opposite ends 7 of which are curved in such manner and the spindles are of such length, that the curved surfaces 7 will at all times engage with the ends of the rolls. That is to say, as the coupling rotates, the curved ends 7 will roll over the ends of the rolls, so that there will be practically no lost motion which would permit of longitudinal movement of the spindle 6. The opposite ends of the spindle 6 are enlarged and are provided with teeth 8, so as to snugly fit within and conform to the transverse shape of the coupling sleeves 5, and the faces 9 of the teeth are curved, so that when the coupling is rotated, these faces will articulate with the coupling sleeves 5 without appreciable lost motion. It will further be noted from Figure 4 that the portions of the ends of the spindle lying between the teeth 8 are also curved so that such ends of the spindle will at both their larger and smaller sections closely conform to spherical shape.

By this arrangement, the faces 9 of the teeth will properly articulate at all times with portions 10 of the coupling sleeves while the bases of the teeth 8 will properly articulate with portions 11 of the coupling sleeves similarly to the functioning of the well known ball and socket joint.

The opposite or enlarged ends of the spindle 6 project well within the portions of the coupling sleeves which project beyond the ends of the roll, engage with the ends of the rolls and are housed within cap members 12, one of which is shown in central section perspective in Figure 6. The caps 12 are cup shaped, so that the interior surface 13 is in the form of a substantially spherical section and the adjacent ends of the sleeves 5 are complementarily shaped at 14, so that the caps 12 are adapted to articulate over the surfaces 14 without lost motion. The centers of the caps are cut away in such configuration as to be complementary with the cross section shape of the spindle 6 and within the base of each cap is positioned a similarly cut away gasket 15. The gaskets 15 are preferably of some soft pliable or resilient material which may be suitably metallically reinforced if desired, so that the gaskets will be maintained in the bases of the caps and will conform to the shape of the spindle in such manner as to preclude undue leakage of a lubricant introduced into the interior of the sleeves 5. Such lubricant may be introduced through an oil hole 16 which is normally closed by a screw plug 17.

In order that the caps 12 may be properly spaced apart, suitable spacing means is employed, and while this spacing means may partake of any one of many forms, it is here shown as embodying a plurality of bars or ribs 18. The spacers 18 are adapted to seat in channels 19 which are formed in the spindle 6 and extend longitudinally thereof and are adapted to be held in seated positions by means of a strap 20 embracing all of the spacers and having its ends united at one of them. The strap 20 is preferably secured to each spacer as shown in Figure 5.

The spacers are thus relatively loosely maintained in a position to lie longitudinally of the spindle with their opposite ends engaging the caps 12 and the opposite ends of such spacers are curved or rounded over at 21, so that, as the coupling rotates, an articulating action will result and binding or lost motion will not occur. The spacers serve to hold all of the parts in assembled relation since it will be noted that by holding the caps apart, the coupling sleeves 5 are maintained from withdrawal from the ends of the rolls 1 and 2. When it is desired to dismantle the coupling, it is only necessary to release one end of the strap 20 whereupon all of the spacers may be removed. The caps 12 may then be brought together intermediate the ends of the spindle 6, the coupling sleeves 5 may be withdrawn from the ends of the rolls, and the coupling bodily lifted out of position.

It will be apparent from the foregoing detailed description of the coupling shown in the drawing, that there is efficient articulating action between all moving parts of the coupling, namely, between the ends 7 of the spindle and the ends of the roll; between the faces of the teeth and the enlarged ends of the spindle and the interiors of the sleeves 5; between all of the parts of the enlarged ends of the spindle and the remaining parts of the interior of the sleeves 5; between the interiors of the caps 12 and the interiors of the sleeves 5, and, between the ends of the spacers and the ends of the caps. In fact, substantially all of the parts of the coupling articulate and there is practically no lost motion.

As hereinbefore pointed out, the coupling is particularly adapted, when used as described, to couple together two rotatable parts for synchronous operation, although I am aware that substantially one half of the coupling construction may be employed as a universal joint by forming the enlarged toothed end on a driving or driven shaft which would correspond to the spindle 6, eliminating the spacers 18 and holding the cap 12 in position in any suitable manner.

In rolling mill construction, it is the practice to mount the rolls in bearings so that longitudinal movement of the rolls is precluded, so that in showing the coupling of this invention, no means is illustrated to preclude movement of one of the sleeves 5 in a direction away from the other sleeve.

The construction of the mill is such as to render the provision of such means unnecessary. The same is true of line shafting and other similar arrangements in which the coupling may be employed.

The construction described will operate in a practically noisless manner and the parts are so fitted together that wear is minimized. Moreover, in the event that the coupling becomes worn and develops lost motion, such wear will entirely occur between the coupling sleeves 5 and the enlarged ends of the spindle. In the event of the development of such wear, the coupling need not be thrown away, but the sleeves 5 merely replaced by slightly oversized sleeves which will render the coupling substantially efficient as when new.

Having thus fully described the invention, what I claim as new and desire to secure by Letters Patent is:

1. A coupling embodying a shaft provided at its end with a plurality of symmetrical cut-out portions, a spindle provided with a combined tooth and ball shaped end, and a sleeve embracing the shaft and spindle and having an interior of uniform cross section throughout its entire length and said cross section being complementary to the shaft and the spindle ends, and all parts of the spindle ends which are in contact with the interior of the sleeve being curved to permit of articulation between the parts.

2. A coupling embodying a shaft provided at its end with a plurality of symmetrical cut-out portions, a spindle provided with a combined tooth and ball shaped end, a sleeve slidably embracing the shaft and spindle and having an interior of uniform cross section throughout its entire length, said cross-section being complementary to the shaft and the spindle ends, all parts of the spindle end which are in contact with the interior of the sleeve being curved to permit of articulation between the parts, and means associated with the spindle for maintaining the sleeve upon the shaft and the ball shaped end of the spindle within the sleeve without interfering with the articulation between the parts.

3. A coupling embodying a shaft, one end of which is provided with symmetrical cut-out portions, a sleeve provided for its entire length, with a uniform, cross-sectional interior, complementary to the end of the shaft, and adapted to have a sliding fit thereover, for the purpose of maintaining one end of the sleeve on the shaft, with the shaft and sleeve locked together for rotation, a spindle provided with a combined, toothed and ball-shaped end having a cross-section complementary to the interior cross-section of the sleeve and adapted to be received into the other end of the sleeve, whereby the shaft and spindle are locked together for simultaneous rotation and are adapted for articulation with respect to one another.

4. A coupling embodying a shaft, one end of which is provided with symmetrical cut-out portions, a sleeve provided for a portion of its length with an interior complementary to the end of the shaft and adapted to have a sliding fit thereover for the purpose of mounting the sleeve upon the shaft for simultaneous rotation, a spindle provided with a combined toothed and ball shaped end adapted to be received into the other end of the sleeve, which is provided with a complementary shaped socket adapted to receive the same with a longitudinal sliding fit, and means associated with the spindle for maintaining the sleeve in engagement with the shaft and the spindle in engagement with the sleeve while permitting articulation of the ball shaped end thereof within the sleeve.

5. A coupling embodying a shaft, a spindle positioned beyond the end of the shaft and provided with a rounded end engaging with the shaft end, means embracing the end of the shaft and also embracing the end of the spindle for locking these parts against relative rotation, and permitting of angular movement of one with reference to the other, and means for maintaining the spindle end and shaft end at all times in contact for rolling coaction.

6. A coupling embodying a shaft, a spindle positioned beyond the end of the shaft and provided with a combined tooth and ball shaped end shaped to engage with and have rolling coaction with respect to the end of the shaft, and a member locked against rotation to the end of the shaft and embracing the tooth and ball shaped end of the spindle, said member having a socket into which the tooth and ball shaped end of the spindle is received and which socket has an interior cross section substantially complementary to the cross section of the spindle end, whereby the spindle is locked for rotation with respect to said member and is adapted for articulation within the socket while rotated therewith and in angular relation to the shaft, and means for maintaining the spindle end within the socket and in engagement with the end of the shaft.

7. A coupling embodying a shaft having a tubular portion extending beyond the end thereof to form a recess, a spindle provided with a combined tooth and ball shaped end extending into the recess, the interior of which recess is of a cross section substantially complementary to the cross section of the spindle end, whereby the spindle is locked to the shaft against relative rotation, a cupped member associated with the spindle and having a cupped interior adapted to engage and articulate with the complementary shaped outer end of the tubular portion associated with the shaft, and means associated with the spindle for maintaining the cupped member in engagement with said tubular portion.

8. A coupling embodying a shaft, a sleeve non-rotatably and demountably associated with one end of the shaft and extending beyond the end of the shaft to form a recess at the end of the shaft, a spindle provided with a combined toothed and ball shaped end projecting into the recess and engaging with the end of the shaft at all times, all parts of the spindle which engage with the end of the shaft or the walls of the sleeve being curved to permit of proper articulation between the parts.

9. A coupling embodying a shaft, a sleeve non-rotatably associated with one end of the shaft and extending beyond the end of the shaft to form a recess at the end of the shaft, a spindle provided with a combined toothed and ball shaped end projecting into the recess and engaging with the end of the shaft, all parts of the spindle which engage with the end of the shaft or the walls of the sleeve being curved to permit of proper articulation between the parts, and a cap encircling the spindle for closing the recess, said cap being provided with a curved surface adapted to articulate with the complementary surface formed at the outer end of the sleeve to obviate lost motion, and means for maintaining the articulating surfaces of the cap and sleeve in contact with one another.

10. A coupling embodying a shaft, a sleeve non-rotatably associated with one end of the shaft and extending beyond the end of the shaft to form a recess at the end of the shaft, a spindle provided with a combined toothed and ball shaped end projecting into the recess and engaging with the end of the shaft, all parts of the spindle which engage with the end of the shaft or the walls of the sleeve being curved to permit of proper articulation between the parts, a cap encircling the spindle for closing the recess, said cap being provided with a curved surface adapted to articulate with the complementary surface formed at the outer end of the sleeve to obviate lost motion, means for maintaining the articulating surfaces of the cap and sleeve in contact with one another, and a gasket associated with the cap and with the spindle for precluding leakage of a lubricant from the recess.

11. A coupling embodying a shaft provided at one end with a recess or pocket, a spindle, one end of which projects into the recess, the interior cross section of the recess and the cross section of the spindle end, which projects into the recess, being shaped with complementary teeth, which serve to preclude relative rotation between the shaft and spindle, the teeth on the interior of the recess being formed in a direction longitudinally of the shaft, on straight lines, and the teeth of the spindle being in a direction longitudinally of the spindle, substantially epicycloidal in shape to permit of proper articulation between the cooperating ends of the shaft and spindle when these parts are rotated together with their axes in angular relation.

In testimony whereof, I have signed my name to this specification.

JOHN KNIGHT.